(No Model.)
D. LIPPY.
VEHICLE SPRING.
No. 457,737.　　　　　　　　　Patented Aug. 11, 1891.
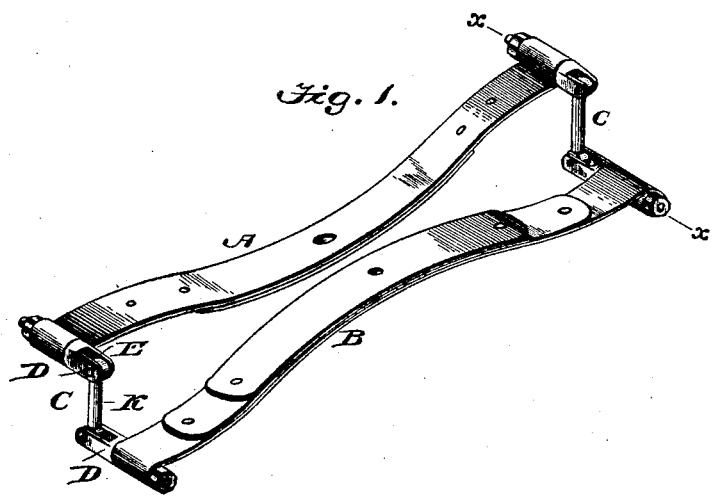
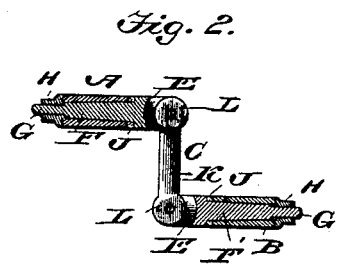
Witnesses:
Rosalind Moore
David Lippy,
Inventor:
By, Thomas E. Barrow,
Attorney.

UNITED STATES PATENT OFFICE.

DAVID LIPPY, OF MANSFIELD, ASSIGNOR OF ONE-HALF TO DANIEL L. SPOTTS, OF CANTON, OHIO.

VEHICLE-SPRING.

SPECIFICATION forming part of Letters Patent No. 457,737, dated August 11, 1891.

Application filed April 28, 1891. Serial No. 390,801. (No model.)

*To all whom it may concern:*

Be it known that I, DAVID LIPPY, a citizen of the United States, residing at Mansfield, in the county of Richland and State of Ohio, have invented certain new and useful Improvements in Vehicle-Springs; and I do declare the following to be a full, clear, and exact description of the invention, such as will enable others skilled in the art to which it appertains to make and use the same.

My invention relates to improvements in vehicle-springs, and has for its object a means to obviate all horse motion to the vehicle-body and at the same time to allow a swinging motion to the body in any direction, and to so construct the same that it will be cheap in manufacture, durable, and efficient in operation. This I accomplish by the mechanism illustrated in the accompanying drawings, in which—

Figure 1 is a perspective view embodying my invention. Fig. 2 is a transverse sectional view taken in line $x$ $x$, Fig. 1, showing the pivot connection, which thoroughly illustrates my invention.

In the accompanying drawings, A and B indicate half-elliptic springs placed side by side and parallel with each other. The inverted spring A is secured to the axle. The spring B is secured to the under side of the body. The springs A and B are connected together at their ends by the pivoted or journaled connection C. The springs A and B are provided at each end with taper holes or eyes, and in which is journaled the studs D. The said studs are constructed with bifurcated ends E and the taper shanks F, and are provided at their outer ends with the male threads G and nuts H. Placed between the shoulders of the bifurcated studs D and the springs A and B are hard-rubber or metallic washers J. These washers are for the purpose of taking up the wear. A number of these washers may be used, so that when the taper shank becomes loose from wear one washer may be taken off and placed between the nut and the spring, which will allow the taper shank to pass farther into the spring, preventing all rattle to the studs. K indicates a connection which is provided at each end with the eyes L and L', and which is pivoted in the bifurcated ends of the studs D. This connection connects the two springs together, forming a flexible connection at each end of the springs and allowing a reciprocating motion to the vehicle-body.

My invention being so simple in construction it will not be necessary for any further description.

Having fully described my invention, what I claim as new, and desire to secure by Letters Patent, is—

1. In combination with two half-elliptic springs placed parallel with each other and having taper eyes or bearings formed at each end, the flexible connection C', composed of the stud D and D', formed with bifurcated ends E and taper shanks F, connection K, and washer J, and nut H, arranged substantially as specified, and for the purpose set forth.

2. A vehicle-spring consisting of two members arranged parallel, and each having a sleeve, eye, or ferrule at each end, studs pivotally fitting in said sleeves, and rods having their ends pivotally connected to said studs, whereby the springs have a lateral and longitudinal movement.

3. A vehicle-spring consisting of two members, each having an eye at each end, studs pivotally connected or fitting in said eyes and having one end bifurcated, and bars having their ends pivotally connected to the bifurcated ends of the studs, for the purpose described.

4. A vehicle-spring consisting of two members having an eye at each end, tapering studs pivotally fitting said eyes, and bars pivotally connecting the studs, for the purpose described.

In testimony whereof I affix my signature in the presence of two witnesses.

DAVID LIPPY.

Witnesses:
J. H. MILLER,
C. W. MARRIOTT.